United States Patent
Yeo et al.

(10) Patent No.: US 7,356,320 B2
(45) Date of Patent: Apr. 8, 2008

(54) APPARATUS AND METHOD FOR REMOVING DC OFFSET IN A FREQUENCY DIRECT-CONVERSION DEVICE

(75) Inventors: Soo-Bok Yeo, Suwon-si (KR);
Sang-Min Bae, Gyeonggi-do (KR);
Jong-Han Lim, Seongnam-si (KR);
Ji-Won Ha, Seoul (KR); Yong-Won Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 513 days.

(21) Appl. No.: 11/015,471

(22) Filed: Dec. 20, 2004

(65) Prior Publication Data

US 2005/0136874 A1 Jun. 23, 2005

(30) Foreign Application Priority Data

Dec. 18, 2003 (KR) ............... 10-2003-0093458

(51) Int. Cl.
*H04B 1/30* (2006.01)

(52) U.S. Cl. ............... 455/234.1; 455/324; 375/319

(58) Field of Classification Search ............ None
See application file for complete search history.

(56) References Cited

U.S. PATENT DOCUMENTS 6,560,448 B1 * 5/2003 Baldwin et al. ......... 455/234.1
6,654,593 B1 * 11/2003 Simmons et al. ........ 455/234.1

FOREIGN PATENT DOCUMENTS

WO WO 03-065600 A1 8/2003

* cited by examiner

*Primary Examiner*—Thanh Cong Le
(74) *Attorney, Agent, or Firm*—Roylance, Abrams, Berdo & Goodman L.L.P.

(57) ABSTRACT

An apparatus for removing a DC offset during frequency direct conversion in a reception device of a wireless communication system. In the apparatus, an adder receives a digital baseband signal comprising a DC component, receives an estimated DC offset value, and calculates a difference between the digital baseband signal with the DC component and the estimated DC offset value. A DC offset calculator receives gain mode information of an analog element of the reception device, and calculates the estimated DC offset value according to the gain mode.

16 Claims, 6 Drawing Sheets

APPARATUS AND METHOD FOR REMOVING DC OFFSET IN A FREQUENCY DIRECT-CONVERSION DEVICE

PRIORITY

This application claims the benefit of 35 U.S.C. §119(a) to an application entitled "Apparatus and Method for Removing DC Offset in a Frequency Direct-Conversion Device" filed in the Korean Intellectual Property Office on Dec. 18, 2003 and assigned Serial No. 2003-93458, the entire contents of which are incorporated herein by reference.

BACKGROUND OF THE INVENTION

1. Field of the Invention

The present invention relates generally to a frequency conversion apparatus and method in a wireless communication system. In particular, the present invention relates to an apparatus and method for direct-converting a frequency in a wireless communication system.

2. Description of the Related Art

Generally, in a wireless communication system, for example, in a Code Division Multiple Access (CDMA) mobile communication system, frequency conversion is performed in order to perform wireless communication. Here, the "frequency conversion" refers to a process of converting either an externally-received high-frequency analog signal into a low-frequency signal, such as a baseband signal, such that it can be processed by the internal integrated circuit chips of a communication device, such as a portable phone, or vice versa. The conversion of a high-frequency analog signal into a baseband signal is called "frequency down-conversion", while converting a baseband signal into a high-frequency analog signal is called "frequency up-conversion." It will be assumed herein that the term "frequency conversion" refers to frequency down-conversion.

The frequency conversion process can be classified into a double conversion scheme and a direct conversion scheme.

Double Conversion

In a double conversion scheme, an externally-received high-frequency signal is processed twice in a radio frequency (RF) module and an intermediate frequency (IF) module. Such a scheme is called a "super-heterodyne scheme," which is the most popular scheme. The double conversion scheme shows stable performance, and has also been popularly used for several decades.

However, a receiver using the double conversion scheme (hereafter referred to as "double-conversion receiver") is difficult to implement. For the implementation of a double-conversion receiver, an RF chip forming an RF module, an IF chip forming an IF module, and several sub-chips included in the IF chip are required. Therefore, the use of the double conversion scheme undesirably increases the cost of a product and the required area of a board. For these reasons, it is unreasonable to use the double conversion scheme for a wireless mobile communication terminal in which its portability is emphasized. In addition, the double conversion scheme is hard to realize in a small-sized portable Multi-Band Multi-Mode (MBMM) terminal that supports multiple bands of, for example, 800 MHz and 2 GHz, and multiple modes of, for example, Personal Communications System (PCS) and Global Positioning System (GPS).

Frequency Direct Conversion

A frequency direct conversion scheme, which does not require an IF module, can remarkably reduce the number of circuit components, compared with the double conversion scheme. In addition, the frequency direct conversion scheme can solve the problems of image rejection and generation of spurious signals, possibly caused by the presence of the IF module. Despite such advantages, the frequency direct conversion scheme is difficult to use because it has it's own problems caused by the frequency direct conversion. The problems include DC offset, I/Q mismatch, inter-modulation distortion (IMD), flicker noise, and the like. Among them, the biggest problem that makes it difficult to realize a frequency direct-conversion receiver is an inflow of a DC offset, which is at a much higher level than the signal.

Therefore, much research has been conducted on methods for removing a DC offset, and a typical method for removing a DC offset is an AC coupling method. The AC coupling method, which uses a characteristic of the DC signal, uses a filter for passing only an AC signal. That is, the AC coupling method high-pass-filters a down-converted signal. Another typical method is a Time Division Multiple Access (TDMA)-based method. The TDMA-based method will now be described below in more detail with reference to FIG. 1.

FIG. 1 is a diagram illustrating a structure of a receiver used for frequency direct conversion in a TDMA system. Referring to FIG. 1, a mixer 110 mixes a high-frequency input signal with a predetermined signal to convert the high-frequency input signal into a baseband signal. The baseband signal output from the mixer 110 is input to a low-pass filter (LPF) 112, and the low-pass filter 112 low-pass-filters the baseband signal. The low-pass-filtered signal output from the low-pass filter 112 is input to an amplifier 116 via a capacitor 114. A switch 118 is connected at a contact point between the capacitor 114 and the amplifier 116. The switch 118 connects the contact point to the ground. The output signal of the capacitor 114 is input to the amplifier 116 only for a predetermined time as determined by a switching operation of the switch 118.

In TDMA, a signal is input to the receiver on a burst basis only for a specific time allocated to a user, in other words, a signal 120 is intermittently input to the receiver as illustrated in the bottom of FIG. 1, and the receiver enters an idle mode for a time when no input signal. In the idle mode, a DC offset occurring in a reception path is stored in the capacitor 114, and a value stored in the capacitor 114 is discharged during reception of data, thereby removing the DC offset.

The AC coupling method is disadvantageous in that it removes even a pure reception signal if a corner frequency is high. According to simulation results, a corner frequency of a high-pass filter (HPF) should be less than 0.1% of a data rate in order that a reduction in reception performance can be ignored in a state where there is no noise signal and frequency offset. For example, for a data rate of 48.6 bps in IS-54, a corner frequency should be 50 Hz or lower. However, in order to show a slow response to the small change in DC offset, a capacitor with a high capacitance and a resistor with a high resistance are required. Therefore, this method can be used only for a system that uses a DC-free modulation scheme in which a desired reception signal has no DC value, for example, a pager application that uses Binary Frequency Shift Keying (BFSK).

A signal with the format used in the TDMA receiver of FIG. 1 is not used in a CDMA system for the following reasons. If there is a high-level interference signal in an idle mode, a DC offset cannot be appropriately removed. In addition, because a passive element such as the capacitor 114 should be used, it is not easy to implement the receiver with highly-integrated Metal Oxide Semiconductor (MOS) transistors. Moreover, in a frequency direct-conversion receiver, when a large amount of DC offset is flowed into its lower circuit, the circuit elements are saturated or damaged undesirably.

SUMMARY OF THE INVENTION

It is, therefore, an object of the present invention to provide an apparatus and method for removing a DC offset through baseband digital signal processing.

It is another object of the present invention to provide an apparatus and method for removing a DC offset during frequency direct conversion in a CDMA system.

It is further another object of the present invention to provide an apparatus and method for preventing saturation or damage of a circuit by removing a DC offset in a frequency direct-conversion system.

To achieve the above and other objects, there is provided an apparatus for removing a DC offset during frequency direct conversion in a reception device of a wireless communication system. The apparatus comprises a first adder for receiving a digital baseband signal comprising a DC component, receiving an estimated DC offset value, and calculating a difference between the digital baseband signal with the DC component and the estimated DC offset value; and a DC offset calculator for receiving gain mode information of an analog element of the reception device, and calculating the estimated DC offset value according to the gain mode.

To achieve the above and other objects, there is provided a method for removing a DC offset during frequency direct conversion in a reception device of a wireless communication system. The method comprises the steps of selecting a gain mode depending on gain mode information of an analog element, and estimating a DC offset value according to the selected gain mode; compensating for a loop gain and a filter gain from the estimated DC offset value; and subtracting the gain compensated-DC offset value from a digital baseband signal including a DC component.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Figure 1:
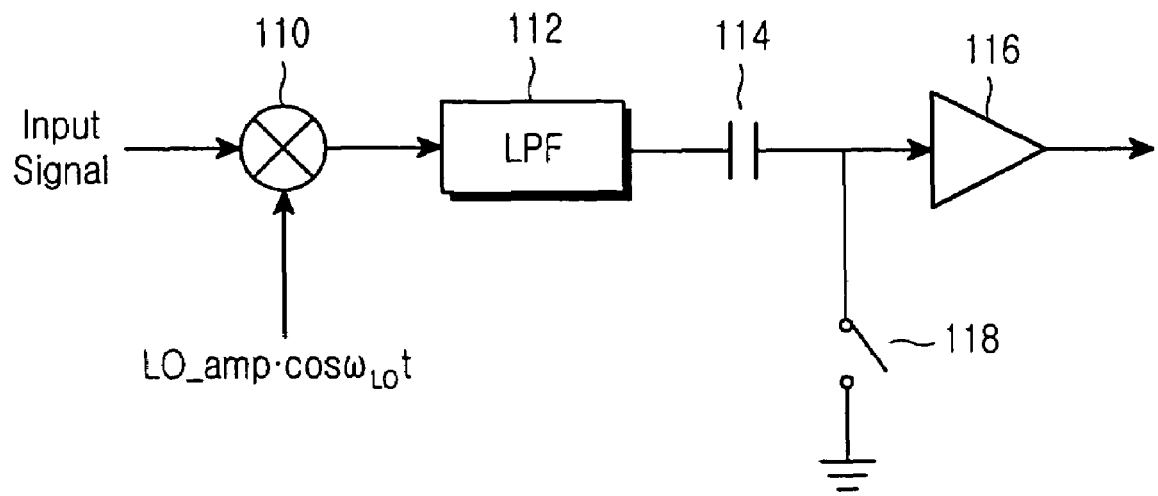
FIG. 1 is a diagram illustrating a conventional structure of a receiver used for frequency direct conversion in a TDMA system.
Figure 1:
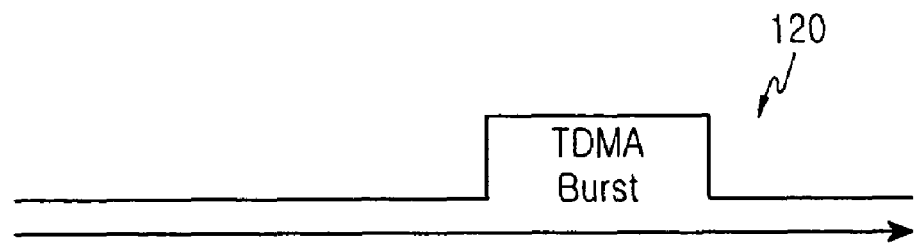

A preferred embodiment of the present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for the sake of conciseness.

In a communication system, a frequency direct-conversion receiver should down-convert a high-frequency input signal directly into a baseband signal as described above, thus generating an undesirable DC offset. The large amount of DC offset that exceeds a dynamic range of a baseband circuit can damage amplifier and filter circuits or clips an output signal of a digital circuit, thereby causing a reduction in reception performance. Major causes for generating a DC offset in the frequency direct conversion scheme can be roughly divided into 3 causes.

First, due to the impossibility of ideal isolation between elements of a receiver, a local oscillation signal may undergo self-mixing. The term "self-mixing" refers to a phenomenon in which a leaked local oscillation signal is reflected in a particular route, and then mixed with the original local oscillation signal. A signal generated due to self-mixing includes a DC offset, which is greater than an input signal by tens of dB or more. In addition, when the local oscillation signal transmitted via an antenna is received back after being reflected, a weak time-varying DC offset may occur.

Second, there is an inflow of a DC offset caused by an even-order harmonic. This is caused by a nonlinearity of RF elements, and in particular, inter-modulation distortion of a second-order harmonic that greatly affects the occurrence of a DC offset.

Finally, a DC offset occurs due to a mismatch of a differential circuit used for an element such as a baseband amplifier. The DC offset occurring due to the circuit mismatch varies according to temperature.

A detailed description will now be made of an apparatus and method for effectively removing the DC offset according to an embodiment of the present invention.

Figure 2:
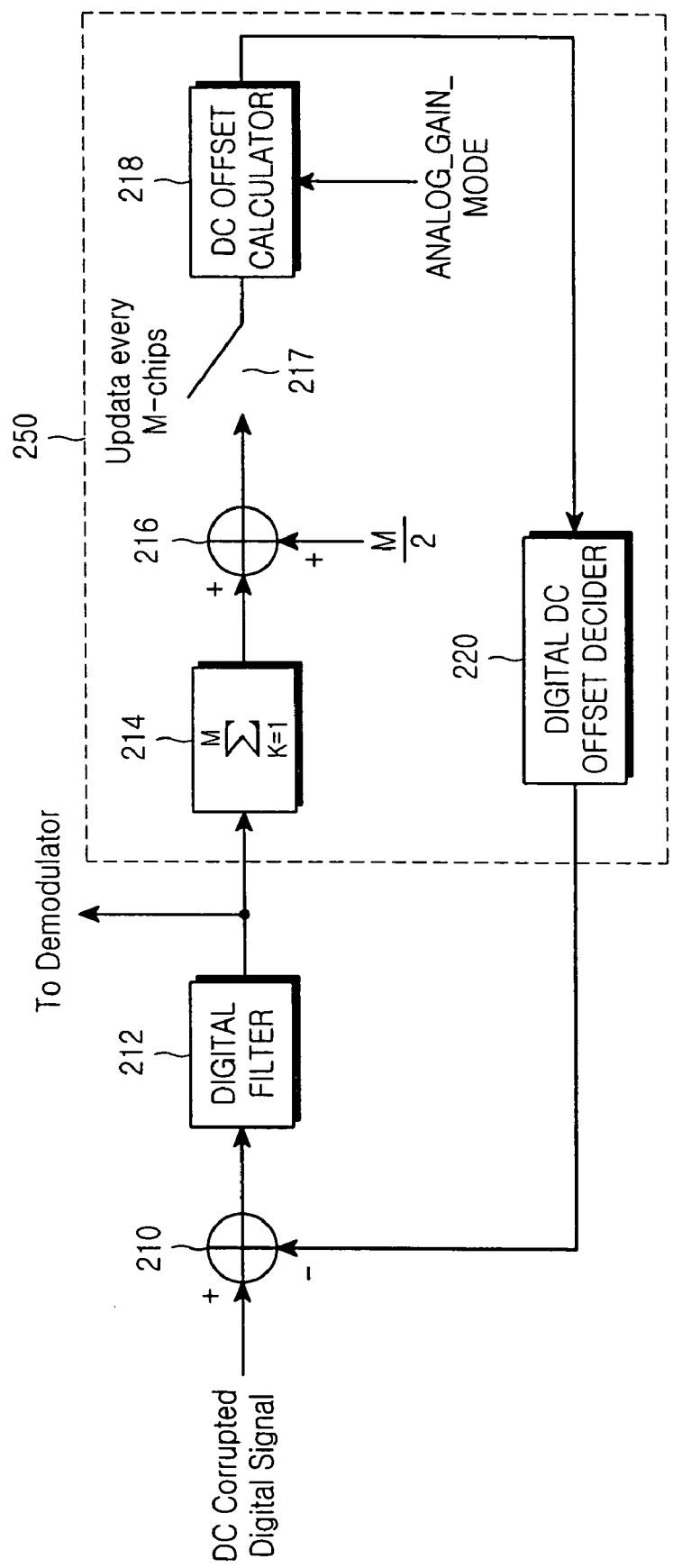
FIG. 2 is a block diagram illustrating an apparatus for removing a DC offset in a frequency direct-conversion device according to an embodiment of the present invention.

FIG. 2 is a block diagram illustrating an apparatus for removing a DC offset in a frequency direct-conversion device according to an embodiment of the present invention.

Referring to FIG. 2, an input signal, which is a DC-corrupted digital signal, is input to an adder 210. Here, the "DC-corrupted signal" refers to a signal corrupted by a DC offset in a frequency direct down-conversion process. The DC offset occurs due to the foregoing 3 reasons. That is, the DC offset is a signal converted into a digital signal by an analog-to-digital (A/D) converter (not shown) for baseband signal processing. The adder 210 removes the DC offset by subtracting an estimated DC offset value of a digital DC offset decider 220 from a DC offset-added signal. The DC offset-removed signal is input to a digital filter 212, and the digital filter 212 filters the DC offset-removed signal and outputs the filtered signal to a demodulator of a receiver. Also, the filtered signal output from the digital filter 212 is input to a DC offset estimator 250, which estimates a DC offset value according to an embodiment of the present invention. The digital filter 212 arranged in the rear of the adder 210 can be implemented with a general low-pass filter, and can serve as a matched filter of the receiver. Alternatively, the digital filter 212 can be arranged in front of the adder 210 at the discretion of the circuit designer. In this case, the digital filter may be replaced with an analog filter according to a characteristic of an input signal. By arranging the digital filter 212 in the rear of the adder 210 that removes a DC offset, it is possible to prevent a bad influence on the digital filtering possibly caused by an inflow of a large amount of DC offset. For example, the bad influence on the digital filtering includes saturation of an output of a filter. Also, an output of the digital filter 212 is input to a demodulator (not shown) via an automatic gain amplifier (not shown).

The DC offset estimator 250 is comprised of an accumulator 214, an adder 216, a switch 217, a DC offset calculator 218, and a digital DC offset decider 220. Operations of the respective elements will be described below in more detail.

The accumulator 214 in the DC offset estimator 250 accumulates M signals filtered by the digital filter 212. The accumulator 214 is used to average channel noises or noises generated in elements of the receiver to thereby remove the noises. Alternatively, in a system using oversampling, a down-sampler can be arranged in front of the accumulator 214 for a system-on-chip design. That is, in a receiver of the oversampling-based system, an on-chip down-sampling process may be needed before samples are accumulated by the accumulator 214. This process is omitted from FIG. 2. In CDMA, oversampling corresponding to 4 or more times a chip rate is achieved. Therefore, in a CDMA system in which oversampling is achieved, a down-sampling process is performed as much as the oversampling. Because the accumulator 214 previously performs down-sampling when oversampling is achieved in the CDMA system, it can accumulate M chips regardless of the oversampling.

The signal obtained by accumulating M chips is input to the adder 216, and the adder 216 adds M/2 to the output of the accumulator 214 in order to compensate for asymmetricity of quantization, which is an asymmetricity occurring when an analog signal is converted into a digital signal. The compensation for asymmetricity can be expressed as M+(0.5×M), where M denotes an accumulated value of an A/D-converted input signal. An output signal of the adder 216 is input to the DC offset calculator 218 by the switch 217 preferably every M chips.

The DC offset calculator 218 estimates a DC offset from an input signal, and outputs the estimated DC offset to the digital DC offset decider 220. An operation and structure of the DC offset calculator 218 will be described later in detail with reference to FIG. 3. The DC offset value calculated by the DC offset calculator 218 is input to the digital DC offset decider 220. The digital DC offset decider 220 decides a digital DC offset value to be included in the accumulated signal. An operation and structure of the digital DC offset decider 220 will also be described later in detail with reference to FIG. 4.

The decided digital DC offset is input to the adder 210, and the adder 210 removes the DC offset value from the DC-corrupted signal, thereby solving the serious DC offset problem of the frequency direct conversion scheme.

Figure 3:
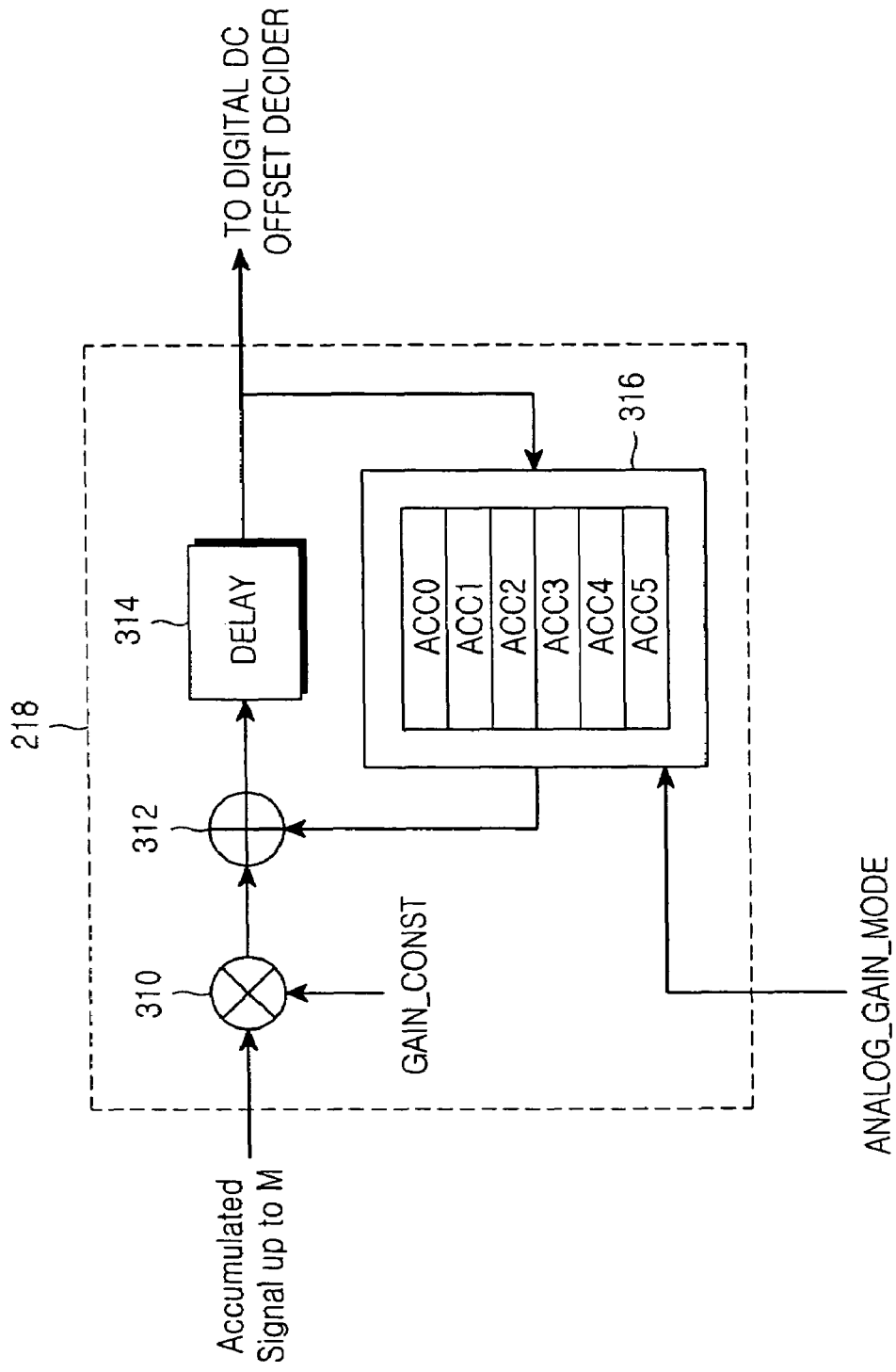
FIG. 3 is a detailed block diagram illustrating the DC offset calculator according to an embodiment of the present invention.

FIG. 3 is a detailed block diagram illustrating the DC offset calculator according to an embodiment of the present invention. With reference to FIG. 3, a detailed description will now be made of a structure and operation of the DC offset calculator according to an embodiment of the present invention.

The DC offset calculator 218, an estimator for estimation of a DC offset value, is formed of a first-order loop filter, and has a feedback-accumulation register 316. It is assumed herein that the accumulation register 316 comprises 6 accumulation register elements.

A description will now be made of a structure and operation of the DC offset calculator 218 comprised of the first-order loop filter. In FIG. 2, the accumulated M-chip signal received from the accumulator 214 is input to a multiplier 310. The multiplier 310 multiplies the accumulated M-chip signal by a constant gain GAIN_CONST. The multiplicand multiplied by the multiplier 310 is a gain constant, and can be set such that it has a different value according to an operation point of the receiver. For example, the multiplicand can be set such that it has a large value for a fast offset calculation during initial driving, and has a small value after an offset estimation is performed to some extent so that any fluctuation of the calculated DC offset value is small. Although such control is not illustrated in the accompanying drawings, the receiver can be constructed such that the control is achieved by a processor. In an embodiment of the present invention, the constant gain is set such that it has two kinds of values: one is a value to be used during initial driving and another is a value to be used after the initial driving.

The accumulated M-chip signal multiplied by the constant gain value is input to an adder 312. The adder 312 adds a signal input from the accumulation register 316 to the output signal of the multiplier 310. Here, the adder 312 calculates a difference between the output signal of the multiplier 310 and the output signal of the accumulation register 316. In this way, the adder 312 can calculate an error between a current input value and a previous input value. The accumulation register 316 will be described later in more detail. An output of the adder 312 is input to a delay 314, and the delay 314 delays the output signal of the adder 312 for a predetermined time. An output of the delay 314 is input to both the digital DC offset decider 220 of FIG. 2 and the accumulation register 316.

The accumulation register 316 stores the previous accumulation values for estimation of a DC offset. It is assumed herein that the accumulation values are separately stored in 6 register elements. In an alternative embodiment, the accumulation values can be stored in a single register rather than 6 separate register elements, and then read out by addressing. Also, the number of register elements is subject to change as more or less register elements can be used. The 6-element accumulation register 316 outputs one of the accumulation values stored according to 6 different gain modes. The gain modes are selected by the accumulation register 316 using analog gain mode information ANALOG_GAIN_MODE from an automatic gain controller (AGC; not shown) of the receiver. Upon receiving the analog gain mode information, the accumulation register 316 selects one of the 6 register elements and outputs a value according thereto. The analog gain mode information illustrated in FIG. 3 is a signal indicating gain modes of analog elements, acquired from the automatic gain controller. More specifically, the analog gain mode information is set by the automatic gain controller, and is determined according to gains of a low-noise amplifier (LNA; not shown) and a mixer in the receiver, in order to match a gain of the automatic gain controller to its linear operation range. A detailed description thereof will be made later with reference to FIG. 5.

Also, the gain control is achieved according to increase/decrease in level of a fading signal. If one of the 6 accumulation values is selected by the accumulation register 316, the adder 312 can calculate a DC offset value by subtracting the selected accumulation value from the M-chip signal multiplied by the constant gain.

The DC offset calculator 218 is formed of a one-pole Infinite Impulse Response (IIR) low-pass filter. A loop bandwidth of this filter is changeable according to a constant gain as described above. That is, a constant gain value, which is a gain constant, is a parameter related to an estimation speed of a DC offset. Therefore, it is possible to widen a loop bandwidth by increasing the constant gain value, or narrow the loop bandwidth by decreasing the constant gain value. It is preferable to use a large gain constant when making a transition from an initial state to a normal state. When a loop of the DC offset remover operates stably, a small gain constant is used. Such control can be achieved in a processor as described above. The DC offset estimated by the loop filter in the DC offset calculator 218 is input to the digital DC offset decider 220, and the digital DC offset decider 220 calculates an estimated DC offset value through appropriate scaling.

Figure 4:
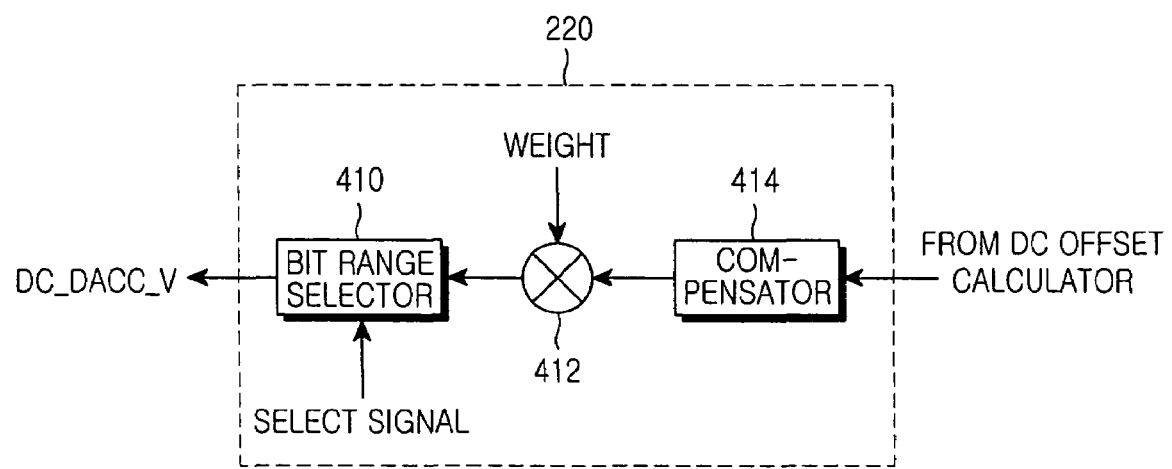
FIG. 4 is a detailed block diagram illustrating the digital DC offset decider according to an embodiment of the present invention.

FIG. 4 is a detailed block diagram illustrating the digital DC offset decider according to an embodiment of the present invention. With reference to FIG. 4, a detailed description will now be made of a structure and operation of the digital DC offset decider 220 according to an embodiment of the present invention.

Referring to FIG. 4, the digital DC offset decider 220 receives an output signal of the loop filter as illustrated in FIG. 3, and finally calculates an estimated DC offset value having a resolution suitable for a level of the DC-corrupted input signal of FIG. 2. That is, there exists a gain of a digital filter, M-signal accumulation, and a gain of a loop filter from an input terminal of an initial DC-corrupted digital signal to an output terminal of FIG. 3, and the digital DC offset decider 220 performs an operation of matching these values to a signal level for compensation therein. The operation will now be described together with the operations of respective elements.

An output signal of the DC offset calculator 218 is input to a compensator 414. The compensator 414 compensates for M-signal accumulation. If M is a multiple of 2, the compensator 414 can be simply realized by bit shifting. An output signal of the compensator 414 is input to a multiplier 412. The multiplier 412 multiplies the output signal of the compensator 414 by a predetermined weight DC_FILT_GAIN, and outputs the result to a bit range selector 410. Here, the weight is a multiplicand used for compensating for a gain value of a digital filter and a gain value of a loop filter. Therefore, if the gain is higher than 1, the weight will be lower than 1, and if the gain is lower than 1, the weight will be higher 1. The weighted value is input to the bit range selector 410. The bit range selector 410 outputs an estimated DC offset value in response to a select signal DC_BITSEL. To cope with a complicated division calculation, the bit range selector 410 preferably accomplishes the division calculation by simply selecting a predetermined bit range from a bit stream output from the multiplier 412. Therefore, the weight and the select signal are calculated taking the digital filter gain and the loop filter gain into consideration.

In conclusion, an output DC_DACC_V of the digital DC offset decider 220 becomes an estimated DC offset value, and a value determined by subtracting the estimated DC offset value from a DC-corrupted input signal becomes a compensated signal. Therefore, the entire loop of FIG. 2 becomes a DC-notch filter, and removes a DC offset through digital-domain signal processing. The DC offset removing apparatus according to an embodiment of the present invention requires the foregoing structures separately for an I-channel signal and a Q-channel signal when receiving a Quadrature Phase Shift Keying (QPSK) signal.

With reference to FIGS. 2 to 4, a detailed description will now be made of a frequency direct-conversion operation in a receiver (not shown).

Unlike the conventional method of removing a DC offset occurring in a frequency direct conversion process in an analog domain, the method proposed in an embodiment of the present invention removes a DC offset through baseband digital signal processing. Although a DC offset is removed in a digital domain in an example of FIG. 2, an estimated DC offset can also be removed in an analog domain. In the case where a DC offset is removed in an analog domain, a digital signal is converted into an analog signal through a digital-to-analog (D/A) converter or a Pulse Duration Modulation (PDM) modulator and a DC offset is removed in an analog domain.

That is, a control signal corresponding to the amount of estimated DC offset is sent to an analog circuit in the receiver. Alternatively, removal of a DC offset can be separately achieved in two steps: one step in an analog domain and another step in a digital domain. That is, the method of removing a DC offset comprises a first step of primarily removing a DC offset in an analog domain, and a second step of removing a remaining DC offset in a digital domain. In the first step of removing a DC offset in an analog domain, a DC offset occurring in a circuit is statically removed using a first-order Phase-Locked Loop (PLL) filter with a narrow bandwidth. In the second step of removing a DC offset in a digital domain, a DC offset is dynamically removed using a first-order PLL filter with a wide bandwidth. The scope of the embodiments of the present invention comprises the method of removing a DC offset in an analog domain using a digital control signal, and the use of a DC offset remover. For convenience, however, a DC offset remover operating only in a digital domain will be illustrated, by way of example.

A description will now be made of the reason for outputting different values stored in the accumulation register 316 according to analog gain modes as described in conjunction with FIG. 3.

Generally, a frequency direct-conversion receiver provides a control signal to a variable gain amplifier (VGA) in a baseband, for gain control. A control signal for gain control is generated by an automatic gain controller (AGC). The automatic gain controller controls its gain by providing a control signal to the variable gain amplifier so that a received signal has constant amplitude. However, generally, the variable gain amplifier in use cannot cover the entire dynamic range of a received signal. For example, a CDMA signal can have a dynamic range of about 80 dB according to its channel environment, but a linear range of the variable gain amplifier is about 30 to 40 dB, which is much lower than the dynamic range of the CDMA signal. Therefore, in order to appropriately receive a signal having a wide dynamic range, it is necessary to match a dynamic range of a received signal at a front stage of the variable gain amplifier to 30 to 40 dB, which is a dynamic range coverable by the variable gain amplifier.

In order for an antenna module to reduce a wide dynamic range to a dynamic range coverable by the variable gain amplifier, it is necessary to perform gain control in an RF circuit. Therefore, gain control on such RF elements as a low-noise amplifier and a mixer is indispensable for the frequency direct conversion scheme. Gain control on RF elements, unlike gain control on the variable gain amplifier, can be continuously achieved on a discrete basis. For that purpose, several gain modes are defined for RF elements, and a gain value of the RF elements is changed according to selected gain modes. For example, gain modes of the low-noise amplifier and the mixer are defined as High Gain Mode, Intermediate Gain Mode, and Low Gain Mode, and an analog gain value is changed according to gain modes. Through the discrete gain control, a signal with a wide dynamic range at the antenna module is converted into a signal having a dynamic range of 30 to 40 dB coverable by the variable gain amplifier. Generally, 2 or 3 gain modes are used for the low-noise amplifier, and 2 or 3 gain modes are used for the mixer. Through a combination thereof, the possible number of analog gain modes is between 4 and 9.

Figure 5:
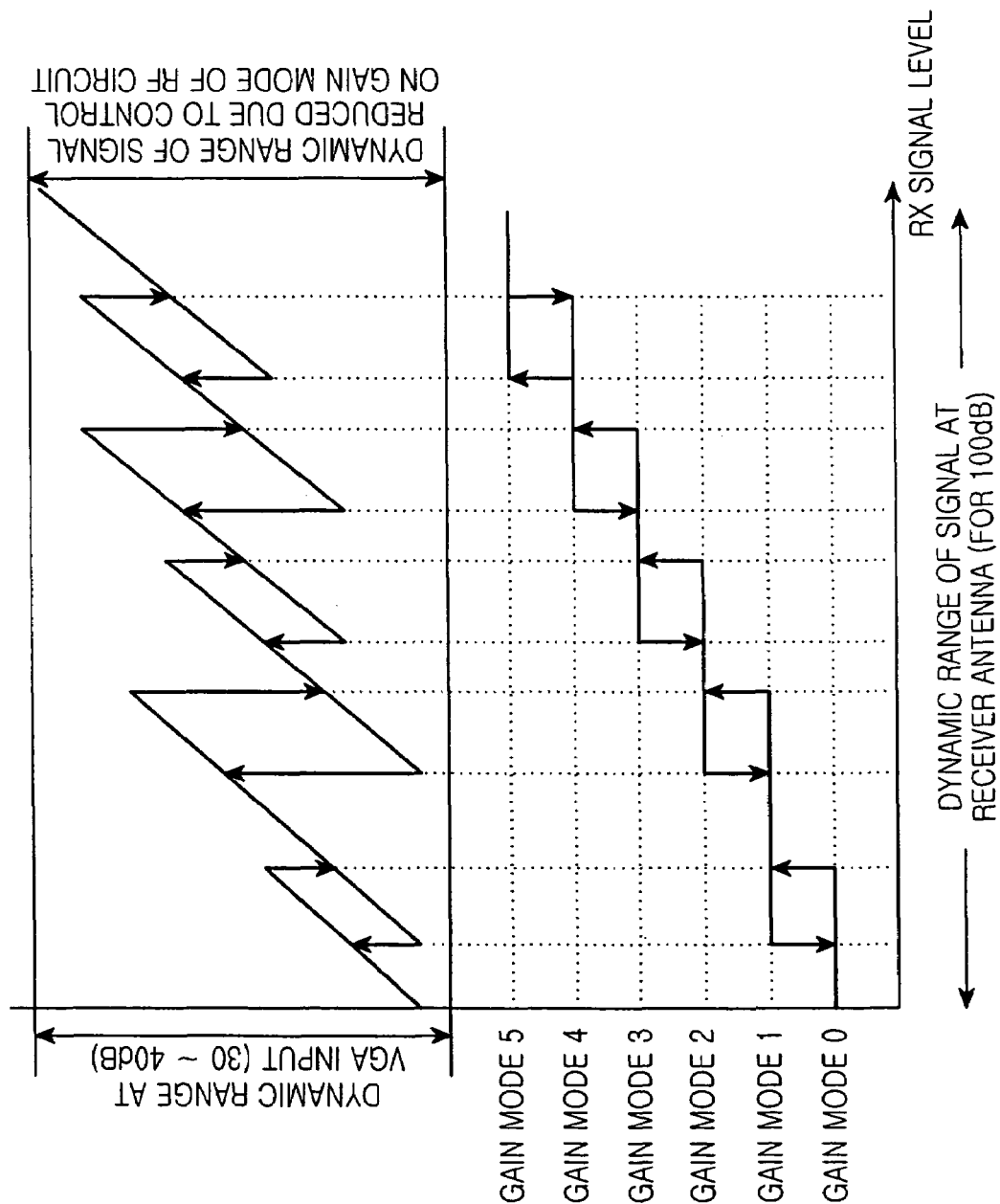
FIG. 5 is an exemplary diagram illustrating how to control a dynamic range for 6 gain modes.

FIG. 5 is a diagram illustrating how to control a dynamic range for 6 gain modes, by way of example. If it is assumed that a dynamic range of a signal at an antenna module of a receiver is 100 dB, a dynamic range of a signal at a variable gain amplifier after appropriate gain control on an RF circuit can be set to 30 to 40 dB. As illustrated in FIG. 5, switching between respective gain modes is made such that it has a multi-level hysteresis curve. By making switching possible such that it has a hysteresis characteristic, it is possible to prevent switching between gain modes from being repeatedly made due to noise included in a signal.

A DC offset can fluctuate in value according to the gain modes of analog circuits (LNA, mixer, and the like) in a frequency direct-conversion receiver because an inflow of a DC offset occurs in an analog module and amplitude of the DC offset can be changed according to gain modes of the analog circuits.

Figure 6:
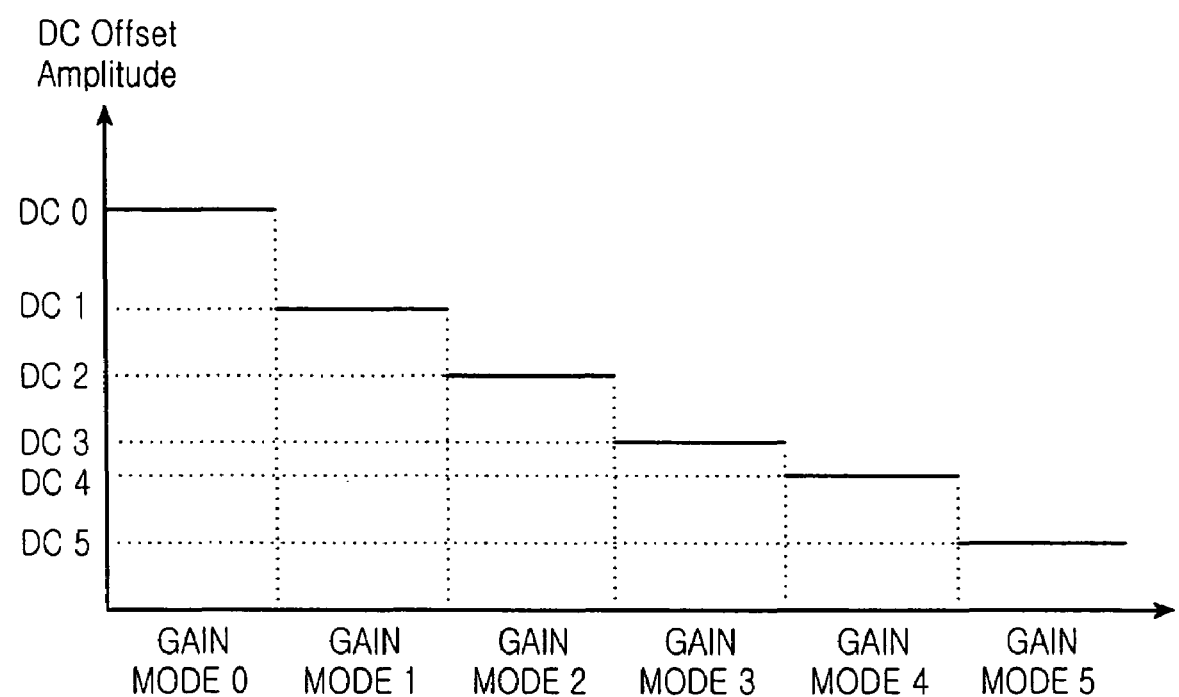
FIG. 6 is an exemplary diagram illustrating a variation in the amplitude of a DC offset based on different gain modes according to an embodiment of the present invention.

FIG. 6 is a diagram illustrating a variation in amplitude of a DC offset according to gain modes. In FIG. 6, DC offsets for respective gain modes are represented by DC0, DC1, DC2, DC3, DC4, and DC5, by way of example, and it is shown that the DC offset values can be changed to different values according to the gain mode selected by switching. Therefore, it is necessary to separately provide DC offset estimators according to gain modes, causing an increase in hardware complexity of the receiver. In order to reduce the hardware complexity, embodiments of the present invention allow the accumulation register 316 to store feedback accumulation values as described in connection with FIG. 3. In this manner, it is possible to efficiently reduce the number of loop filters. In addition, by changing a gain constant according to an analog gain mode, it is possible to appropriately estimate a DC offset that varies dynamically.

As can be understood from the foregoing description, by applying a DC offset remover according to an embodiment of the present invention to a frequency direct-conversion device, it is possible to efficiently remove a DC offset and prevent an increase in circuit complexity. The efficient removal of a DC offset secures stability of the circuit and prevents mis-operation of the circuit.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An apparatus for removing a DC offset during frequency direct conversion in a reception device of a wireless communication system, the apparatus comprising:
   a first adder for receiving a DC corrupted digital baseband signal, receiving an estimated DC offset value, and calculating a difference between the DC corrupted digital baseband signal and the estimated DC offset value; and
   a DC offset calculator for receiving gain mode information of an analog element of the reception device, and calculating the estimated DC offset value according to the gain mode.

2. The apparatus of claim 1, further comprising a DC offset decider for compensating for a loop gain and a filter gain from the estimated DC offset value.

3. The apparatus of claim 1, further comprising an accumulator for receiving an output of the first adder, accumulating as many input symbols as a predetermined value for removal of a channel noise and an element noise, and outputting the accumulated symbols to the DC offset calculator.

4. The apparatus of claim 3, further comprising a second adder connected between the accumulator and the DC offset calculator, for compensating for asymmetricity of the accumulated symbols.

5. The apparatus of claim 4, wherein the second adder adds M/2 to an output of the accumulator, wherein M denotes the number of accumulated symbols.

6. The apparatus of claim 4, further comprising a switch connected between the second adder and the DC offset calculator, for inputting the accumulated symbols to the DC offset calculator every M symbols, wherein M denotes the number of accumulated symbols.

7. The apparatus of claim 1, further comprising:
   a digital filter for low-pass-filtering an output signal of the first adder; and
   a demodulator for demodulating an output signal of the digital filter.

8. The apparatus of claim 1, wherein the DC offset calculator comprises:
   a multiplier for multiplying an input signal of the DC offset calculator by a predetermined constant gain;
   a third adder for calculating a difference between an output of the multiplier and a DC offset value estimated according to the gain mode;
   a delay for delaying an output of the third adder for a predetermined time; and
   an accumulation register for selecting a gain mode depending on the gain mode information of the analog element, storing an output of the delay according to the selected gain mode, and outputting one of the stored values to the third adder.

9. The apparatus of claim 8, wherein the constant gain has different values for initial driving and normal operation, respectively.

10. The apparatus of claim 9, wherein the constant gain for initial driving is larger than the constant gain for normal operation.

11. The apparatus of claim 8, wherein the accumulation register includes register elements for storing different values according to gain modes.

12. The apparatus of claim 1, further comprising a digital DC offset decider, which is connected between the DC offset calculator and the first adder, for compensating for the calculated DC offset value.

13. A method for removing a DC offset during frequency direct conversion in a reception device of a wireless communication system, the method comprising the steps of:
   selecting a gain mode depending on gain mode information of an analog element, and estimating a DC offset value according to the selected gain mode;
   compensating for a loop gain and a filter gain from the estimated DC offset value; and
   subtracting the gain compensated-DC offset value from a DC corrupted digital baseband signal.

14. The method of claim 13, further comprising the steps of:
  low-pass-filtering the signal determined by subtracting the gain compensated-DC offset value from the DC corrupted digital baseband signal and
  demodulating the low-pass-filtered signal.

15. The method of claim 13, further comprising the steps of:
  accumulating as many symbols from which the estimated DC offset value is subtracted as a predetermined number; and
  compensating for asymmetricity of quantization from the accumulated signal.

16. The method of claim 13, wherein the step of estimating a DC offset value comprises the steps of:
  multiplying an input signal by a predetermined constant gain;
  adding a DC offset value determined according to a gain mode, to the multiplication result; and
  delaying the addition result for a predetermined time, and storing the delayed value.

* * * * *